United States Patent [19]

Kawamura et al.

[11] Patent Number: 5,060,215
[45] Date of Patent: Oct. 22, 1991

[54] METHOD AND APPARATUS FOR LEADING-IN FOCUS SERVO BY MOVING THE OBJECTIVE LENS TOWARD THE RECORDING SURFACE AT TWO DIFFERENT SPEEDS

[75] Inventors: Katsumi Kawamura; Ichiro Narumi; Takao Yamada, all of Saitama, Japan

[73] Assignee: Pioneer Electronic Corporation, Tokyo, Japan

[21] Appl. No.: 327,841

[22] Filed: Mar. 23, 1989

[30] Foreign Application Priority Data

Sep. 13, 1988 [JP] Japan ................................. 63-229330

[51] Int. Cl.$^5$ .............................................. G11B 7/00
[52] U.S. Cl. ............................... 369/44.35; 369/44.27; 369/44.29
[58] Field of Search ............... 369/44.11, 44.25, 44.26, 369/44.29, 44.35, 100, 44.27–44.34; 205/201.2, 201.5

[56] References Cited

U.S. PATENT DOCUMENTS

| | | | |
|---|---|---|---|
| 4,541,084 | 9/1985 | Oku et al. | 369/44.29 |
| 4,627,041 | 12/1986 | Uemura | 369/44.29 |
| 4,769,801 | 9/1988 | Funada et al. | 369/44.29 |

Primary Examiner—Roy N. Envall, Jr.
Assistant Examiner—Thang V. Tran
Attorney, Agent, or Firm—Sughrue, Mion, Zinn, Macpeak & Seas

[57] ABSTRACT

A focus servo lead-in method is implemented where the focus servo loop is first in an open state. An objective lens located at a position separated by a predetermined distance from the recording surface of a disk is first moved toward the recording surface at a high velocity. At a predetermined time, the moving velocity is decreased to a lower velocity and the focus servo loop is brought to a closed state based on the level of the focus error signal obtained while the objective lens is moving at the lower velocity.

8 Claims, 4 Drawing Sheets

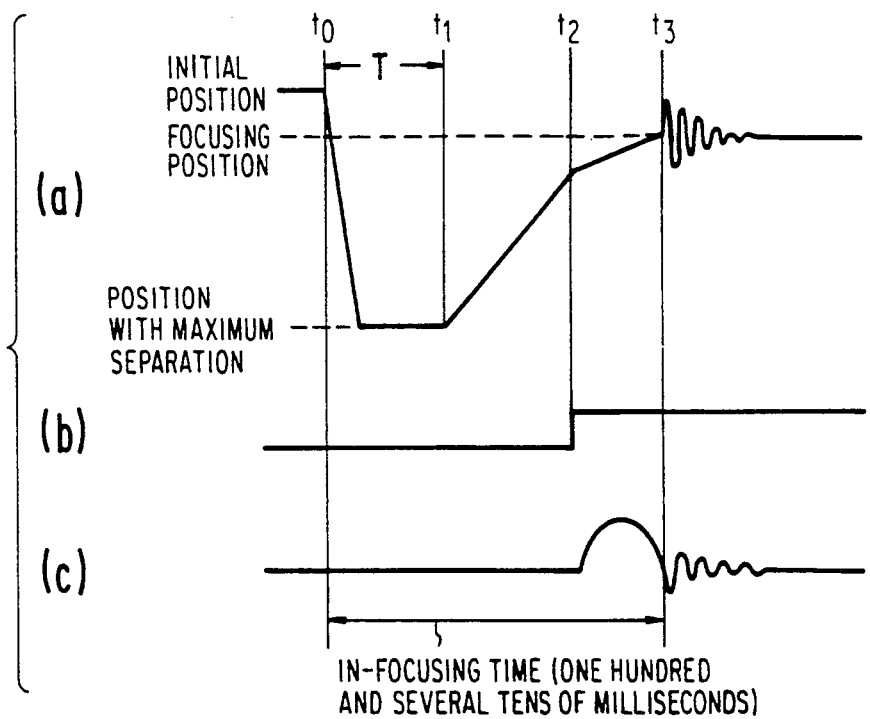
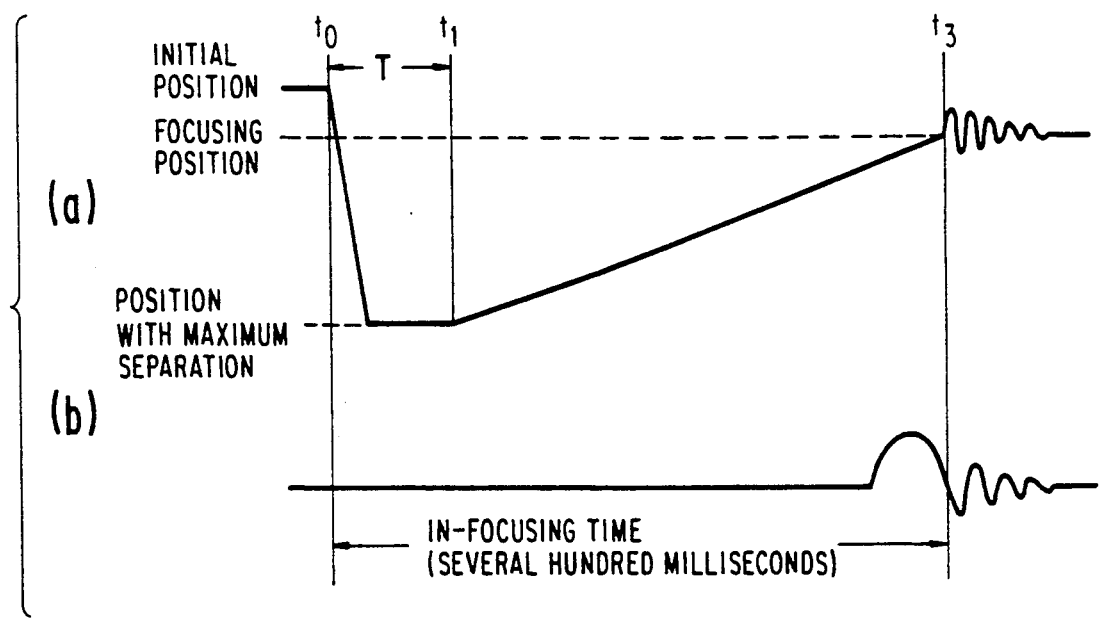

METHOD AND APPARATUS FOR LEADING-IN FOCUS SERVO BY MOVING THE OBJECTIVE LENS TOWARD THE RECORDING SURFACE AT TWO DIFFERENT SPEEDS

BACKGROUND OF THE INVENTION

The present invention relates to a focus servo lead-in method, and more particularly to a focus servo lead-in method and a reproducing device which reproduces information from an optical information recording disk (hereinafter referred to simply as a "disk").

In an optical disk reproducing device, a beam of light converged by an objective lens is projected on the recording surface of the disk. The reading of recorded information is carried out by means of the reflected light (or transmitted light) of the light beam. This requires a precise convergence of the light beam on the recording surface at all times. Thus, a focus servo device must control the position of the objective lens in its optical axis direction.

In such a servo device, if the distance between the objective lens and the recording surface for exact convergence of the light beam on the recording surface of the disk is called $D_0$, the signal level of a focus error signal is at a reference level (e.g., zero level) when the objective lens is at that focused position. The focus error signal varies depending upon the degree of separation when the distance between the objective lens and the reading surface is more or less than $D_0$, with the signal being generated with corresponding polarity based on the light beam passed to the recording surface. Accordingly, the characteristic of the focus error signal for the separation distance between the objective lens and the recording surface is that of a so-called S-shaped curve with its center at the point corresponding to the distance $D_0$. By controlling an actuator for driving the objective lens in the optical direction in response to the signal level of the focus error signal, it becomes possible to always precisely converge the light beam on the recording surface even for a warped disk or the like by enabling the objective lens to move in the direction perpendicular to the recording surface.

As shown in the timing diagram of FIG. 3, the objective lens is generally placed at an initial position close to the recording surface before the start of information reading, so that the lead-in of focus servo is started from that initial position. In the past, for lead-in of the focus servo, the focus servo loop was first set to an open state. A lead-in start command would then be issued when the system was initialized, and the objective lens would be driven from its initial position in a direction away from the recording surface of the disk for a predetermined duration of time T. At time $t_1$, the direction in which the objective lens was moving would be reversed so that the lens approached the recording surface with a predetermined velocity. When the signal level of the focus error signal shown in FIG. 3(b) attained the reference level at time $t_3$, the servo loop was closed.

The constant velocity in the system described above varied with the voltage of the power supply, sensitivity of the servo loop, and the loop gain, and the lead-in would be set to be securely locked in when the servo loop was closed. Therefore, the minimum in-focusing time between the drive starting time $t_0$ and the loop closing time $t_3$ was also necessarily fixed. Ordinarily, the in-focusing time was on the order of several hundred milliseconds. When a short starting time was required, such as when using a recording medium like a CD-ROM, it was difficult to reduce the starting time because of the long in-focusing time required.

SUMMARY OF THE INVENTION

It is, therefore, an object of the present invention to provide a focus servo lead-in method which makes it possible to reduce the in-focusing time.

In accordance with the present invention, when the focus servo loop is originally in an open state, the objective lens, which is located at a position separated by a predetermined distance from the recording surface of a disk, moves toward the recording surface with a high first velocity. Then the velocity of the objective lens is decreased from the first velocity to a second lower velocity at a predetermined time. The focus servo loop is then switched to a closed state based on the level of the focus error signal which is obtained while the objective lens is moving at the second lower velocity.

BRIEF DESCRIPTION OF THE DRAWINGS

Other features and advantages of the present invention will be apparent from the following description taken in conjunction with the accompanying drawings, wherein:

Fig. 1b is a block diagram illustrating the arrangement of objective lens with respect to a disk, the position of the object lens being controlled by the servo focus device of FIG. 1a;

FIG. 2 is a timing diagram for explaining the servo lead-in operation implemented using the circuit shown in FIG. 1;

FIG. 3 is a timing diagram for explaining the prior art servo lead-in operation.

DETAILED DESCRIPTION OF THE INVENTION

Figure 1A:
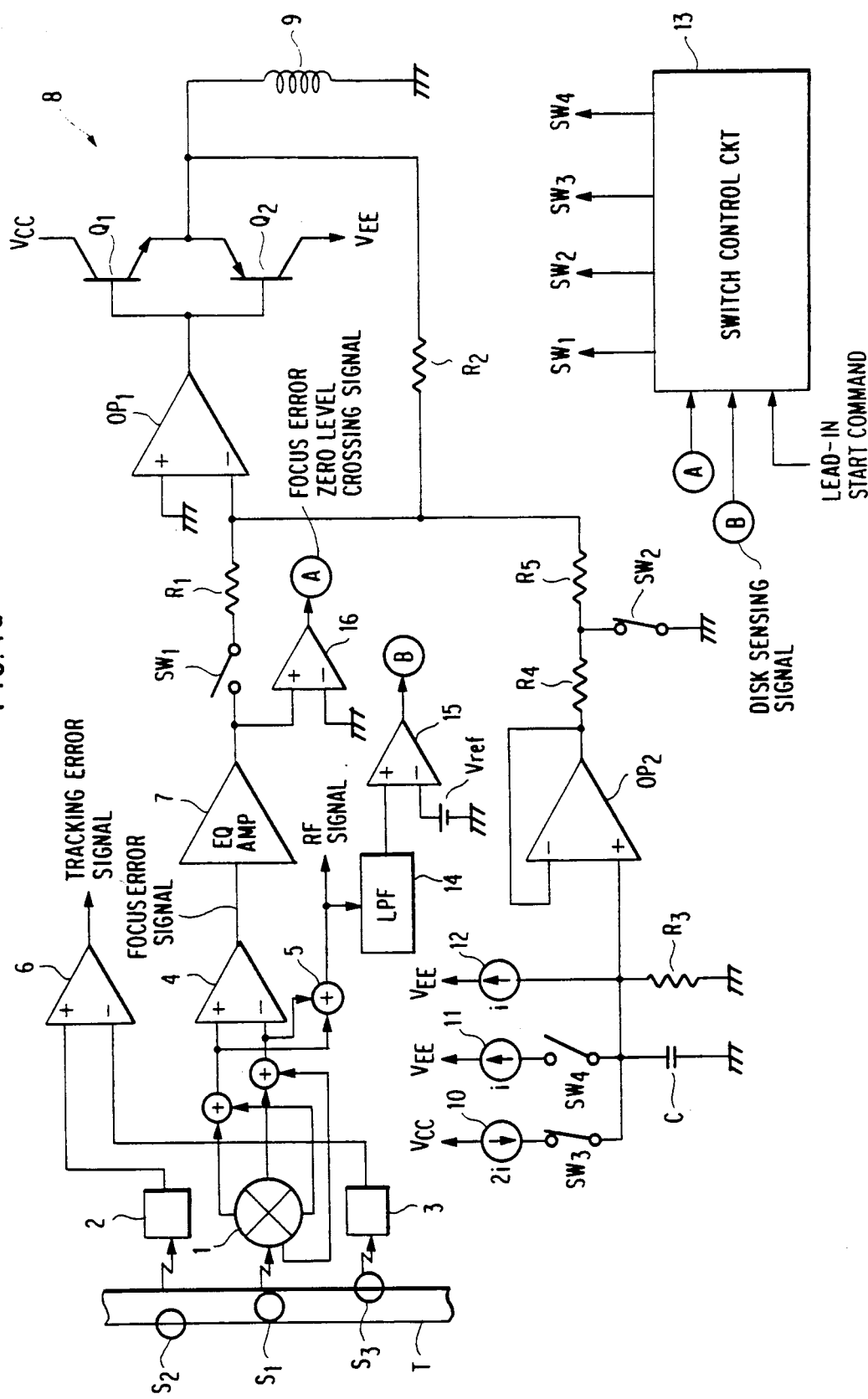
FIG. 1a is a block diagram showing an embodiment of a focus servo device to which the servo lead-in method of the present invention is applied.

Referring to the drawings, an embodiment of the present invention will be described as follows.

Figure 1B:
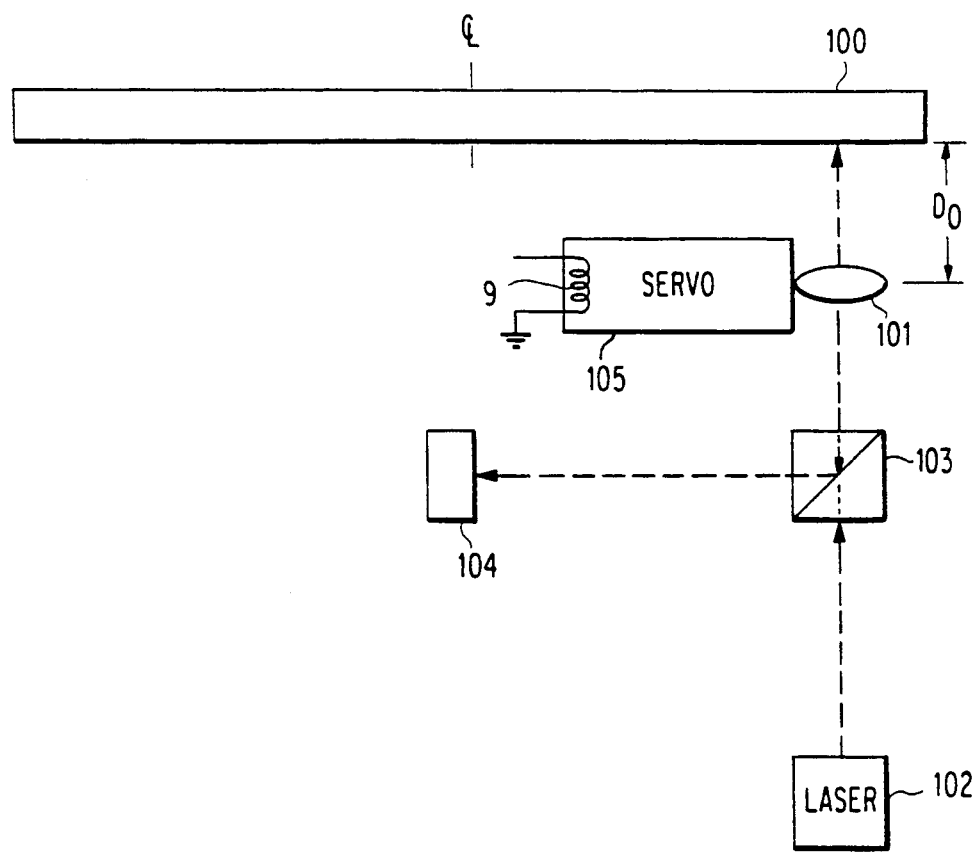

FIG. 1a is a block diagram showing an embodiment of a focus servo device to which the servo lead-in method of the present invention is applied. Three beam spots $S_1$, $S_2$ and $S_3$ obtained by converging a laser beam from a laser 102 onto a pickup 104 via a beam splitter 103 and a recording track T of a disk 100, as shown in FIG. 1b. $S_1$ represents a recorded information reading spot and $S_2$ and $S_3$ represent a pair of tracking information detecting spots that precede and follow the spot $S_1$, respectively. The light beams of these three beam spots reflected by the disk 100 fall on photoelectric conversion elements 1 to 3 built into the pickup 104.

Photoelectric conversion element 1 consists of four mutually independent light receiving elements whose respective light receiving surfaces are formed by dividing a surface into four sections with a pair of lines that are perpendicular to each other. The two values each of which represents the sum of outputs of the elements that are situated mutually opposite with respect to the center of the overall light receiving surface are supplied separately to the inputs of a differential amplifier 4. Differential amplifier 4 detects the difference of the two output sums and this difference serves as the focus error signal. Further, each of the output sums is supplied to an adder 5 where the two output sums are added together, and this sum serves as the reproducing RF signal. Each of the outputs of photoelectric conversion elements 2 and 3 are supplied to a differential amplifier 6 where the difference between these two outputs is detected. This difference serves as the tracking error signal.

After being phase compensated by an equalizer 7, the focus error signal is supplied to the inverting (−) input terminal of an operational amplifier $OP_1$ via a switch $SW_1$ and a resistor $R_1$. The noninverting (+) input terminal of operational amplifier $OP_1$ is grounded. The output of operational amplifier $OP_1$ is supplied to a driving coil 9 of a focus actuator 105 via a driving circuit 8 which consists of complementary connected transistors $Q_1$ and $Q_2$. The driving coil 9 moves an objective lens 101, shown in FIG. 1b, built in the pickup in a direction and by an amount corresponding to the polarity and the level, respectively, of a focus error signal supplied via equalizer 7, switch $SW_1$ and driving circuit 8. A feedback resistor $R_2$ is connected between the output terminal of the driving circuit 8 and the inverting (−) input terminal of the operational amplifier $OP_1$.

A focus servo loop is formed as described above, and it is in a closed state when switch $SW_1$ is in the ON (closed) state. By driving the driving coil 9 based on the level of the focus error signal output from the differential amplifier 4, it is always possible to precisely focus the spot $S_1$ on the recording surface of the disk 100.

A constant current source 10 and constant current sources 11 and 12 are connected to a positive power supply $V_{CC}$ and a negative power supply $V_{EE}$, respectively. The constant current source 10 feeds a constant current 2i which is supplied via a switch $SW_3$ to the noninverting (+) input terminal of an operational amplifier $OP_2$. A parallel circuit comprising a resistor $R_3$ and a capacitor C is connected between the noninverting input terminal of operational amplifier $OP_2$ and ground. Constant current source 11 draws a constant current i from the noninverting (+) input terminal of the operational amplifier $OP_2$ via a switch $SW_4$. Constant current source 12 draws a constant current i directly from the noninverting (+) input terminal of the operational amplifier $OP_2$. Since the inverting (−) input terminal and the output terminal of the operational amplifier are commonly connected, the output of the operational amplifier $OP_2$ is supplied to the inverting (−) input terminal of operational amplifier $OP_1$ through resistors $R_4$ and $R_5$. Switches $SW_1$ to $SW_4$ are respectively switched and controlled with appropriate timing by means of a switch control circuit 13.

The output sum of adder 5 serves as an RF signal and as a signal corresponding to the total quantity of light reflected from the recording surface of the disk 100. The DC component of this output is detected using a low pass filter (LPF) 14. The detected voltage is compared to a reference voltage $V_{ref}$ in a voltage comparator 15. The compared output of voltage comparator 15 is used as a disk sensing signal B indicating the presence or absence of a disk 100. This signal is supplied to the switch control circuit 13. Further, the focus error signal which passed through equalizer 7 is supplied as a comparison input to a zero cross comparator 16. The output of the zero cross comparator 16 is supplied to the switch control circuit 13 as a zero cross detection signal A which indicates the crossing of a zero level (reference level) by the focus error signal.

Figure 4:
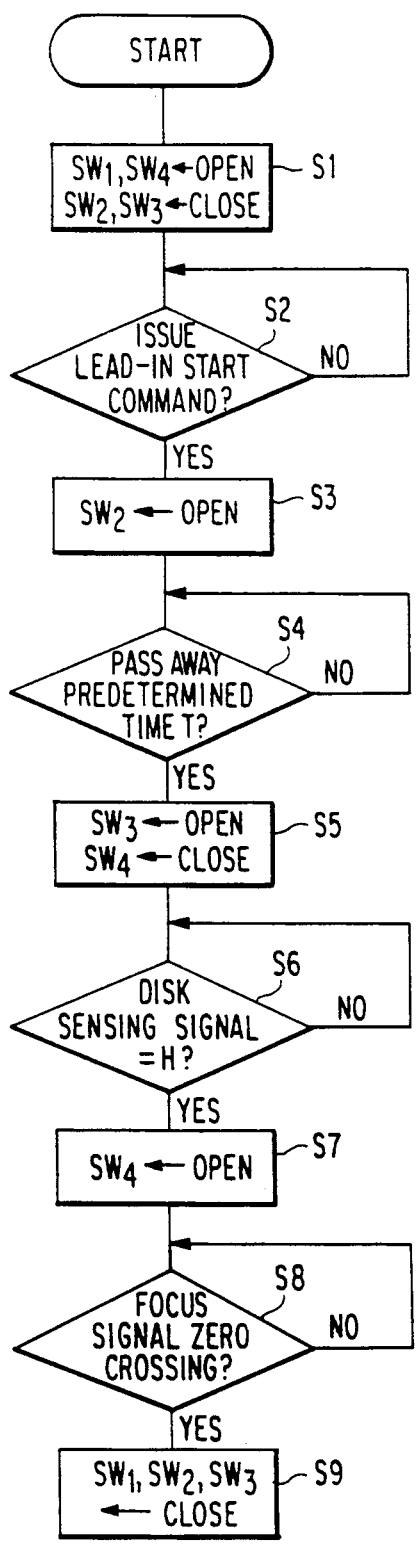
FIG. 4 is a flow chart illustrating the operation of the focus servo device of FIGS. 1a and 1b.

Next, referring to the timing diagram shown in FIG. 2, and the flow chart of FIG. 4, the lead-in operation of the focus servo device of FIG. 1 will be described.

Initially, switches $SW_1$ and $SW_4$ are in an OFF (open) state and switches $SW_2$ and $SW_3$ are in an ON (closed) state as shown in step S1. A constant current source having an effective current i which is the difference between the constant current sources 10 and 11 is connected to the power supply $V_{CC}$. A DC potential (corresponding to the farthest separated position of the objective lens from the recording surface) determined by the aforementioned constant current source and resistor $R_3$ is generated at the output of operational amplifier $OP_2$. When a lead-in start command is issued at time $t_0$, step S2, to start the system in the initial state, switch control circuit 13 switches switch $SW_2$ from the ON-state (closed) to the OFF-state (open). As a result, the voltage generated at the output of operational amplifier $OP_2$ is supplied to operational amplifier $OP_1$ via resistors $R_4$ and $R_5$, and the objective lens 101 is driven for a predetermined length of time T in a direction away from the recording surface of the disk 100 at step S3. Within time T, as shown in FIG. 2(a), the objective lens 101 moves from the initial position with respect to the disk recording surface to a position of maximum distance from the recording surface which is determined by the aforementioned voltage generated at the output of operational amplifier $OP_2$.

Upon detecting that the predetermined time T has elapsed at time $t_1$, step S4, the switch control circuit 13 switches switch $SW_3$ to the OFF-state (open) and switch $SW_4$ to the ON-state (closed), respectively, at step S5. Thus, constant current source 11 is connected in parallel with constant current source 12. As a result, the objective lens 101 is driven to approach the disk recording surface with a high first velocity determined by constant current sources 11 and 12. As the objective lens 101 approaches the recording surface of the disk 100, the DC component of the RF signal detected as the output of the LPF 14 increases. At time $t_2$, the DC component exceeds the reference voltage $V_{ref}$ so that the disk sensing signal B shown in FIG. 2(b) toggles to a high level at the step S6.

In response to the high disk sensing signal, switch control circuit 13 switches switch $SW_4$ to an OFF-state (open) at step S7. In this state, the driving current is decreased to one-half of its previous value due to the connection of only constant current source 12 to the noninverting (+) input terminal of operational amplifier $OP_2$. Thus, the objective lens moves at a second lower velocity determined only by constant current source 12. Immediately after the disk sensing signal shown in FIG. 2(b) switches to a high level, a focus error signal with an S-shaped curve characteristic is generated as shown in FIG. 2(c). A zero cross detection signal is generated at step S8 from a zero cross comparator 16 when the focus error signal shown in FIG. 2(c) first crosses zero at time $t_3$. Switch control circuit 13 switches each of switches $SW_1$ to $SW_3$ to the ON-state (closed) at step S9. This switches the focus servo loop from an open to a closed state. Thereafter, the objective lens 100 is driven in accordance with the level of the focus error signal shown in FIG. 2(c).

As described in the foregoing, when the focus servo loop is in the open state and the objective lens 100 has been removed a predetermined distance from the recording surface of the disk 100, the objective lens 101 moves toward the recording surface at a high velocity which is switched to a lower velocity at a predetermined time. By bringing the focus servo loop to a closed state based on the level of the focus error signal obtained while the lens 101 is moving at the lower velocity, the in-focusing time which has heretofore been about several hundred milliseconds can be reduced to about one hundred and several tens of milliseconds. This substantially reduces the time required for initiating the starting of the system. In addition, when the servo loop is closed, the moving velocity of the objective lens 101 is low enough such that its leading-in can be carried out stably.

Further, by carrying out the shift from the high velocity to the low velocity based on the disk sensing signal, it is possible to reliably generate the disk sensing signal immediately before the generation of the focus error signal. Also, the disk sensing signal indicates the distance from the recording surface of the disk 100 to the objective lens 101. This enables execution of the lead-in to be reliable and stable and reduces the in-focusing time regardless of errors such as those concerning the direction of separation.

In the above embodiment, the shift from the high to the low velocity is carried out based on the disk sensing signal B shown in FIG. 2(b). However, it need not be limited to that method, and it may be achieved as a simplest possible method by means of time management. Namely, it may be achieved by executing the velocity shift at a time occurring a predetermined length of time after the reversal of the moving direction. However, when using this method, it is necessary to set the time with a margin by taking into account the variations in the error about the direction of separation, actuator sensitivity, sliding resistance and the like.

Moreover, when the inertia of the objective lens 101 is large, the velocity reduction may be arranged, instead of switching the driving current, by setting the driving current to zero and waiting until the zero crossing of the focus error signal, or by applying a braking force as needed through supply of a driving current in the reverse direction.

Further, in the above embodiment, the velocity reduction has been described in conjunction with cutting off constant current source 11 by setting a switch (SW4) on the negative supply $V_{EE}$ side to an OFF-state (open). However, it may be accomplished by providing constant current source 11 and switch SW4 on the positive power supply $V_{CC}$ side so that a current i/2 is obtained when switch SW4 is set to be in the ON-state (closed). Further, when the time constant is determined by external capacitance and resistance, its value may be shifted by means of a switch. Still further, in a system where the reverse electromotive voltage of the focus actuator is detected by means of a bridge balanced circuit or the like to apply a feedback with the detected voltage as the velocity information for driving the objective lens at a constant velocity, the situation can easily be dealt with by switching the target value of the constant velocity.

As has been described in the above, according to the focus servo lead-in method of the present invention, the focus servo loop is first set in an open state. An objective lens located at a position separated by a predetermined distance from the recording surface of a disk is first moved at a high velocity in the direction toward the recording surface. Then the moving velocity is switched to a lower velocity at a predetermined time. The focus servo loop is brought to a closed state based on the level of a focus error signal obtained during the motion at the lower velocity. Thus, the in-focusing time which has previously been about several hundred milliseconds can be reduced to about one hundred and several tens of milliseconds so that the actuating time required for starting the system is reduced to a large extent. Further, the moving velocity of the objective lens at the time of closing the servo loop is small so that the leading-in of the focus servo can be accomplished in a stable manner.

What is claimed is:

1. A reproducing device having an objective lens used to focus a beam of light on a recording surface to thereby provide a reflected beam and a focus servo loop for maintaining the focus of said lens, said reproducing device comprising:

first detection means for providing a sum signal representing an intensity of said reflected beam from said recording surface;

first detection signal generating means for generating a first detection signal when said sum signal indicates that said lens is at a first predetermined distance relative to said recording surface;

second detection means responsive to said reflected beam for providing focusing signals representing the state of focusing of said beam on said recording surface;

second detection signal generating means for generating second detection signals by comparing said focusing signal to a second predetermined voltage thereby detecting that said lens is at a position suitable for operation of said focus servo loop;

first power supplying means for supplying a first driving signal to drive said lens towards said recording surface by a first velocity;

second power supplying means for supplying a second driving signal to drive said lens towards said recording surface by a second velocity, said second velocity being less than said first velocity;

means for moving said lens relative to said recording surface in response to either said focusing signal or said first driving signal or said second driving signal; and switching control means for selectively applying said focusing signal, said first driving signal, and said second driving signal to said driving means according to the following sequence:

(a) initially said switching control means selects said first driving signal until said first detection signals are received by said switching control means;

(b) said switching control means selects said second driving signal until said second detection signals are received by said switching control means;

(c) said switching control means selects said focusing signals thereby closing said focus servo loop so that said moving means moves said lens relative to said recording surface in accordance with to said focusing signals.

2. A reproducing device as claimed in claim 1, further comprising means responsive to said sum signal for determining that said lens is at said first predetermined distance, when the intensity of said reflected beam received from said recording surface exceeds a predetermined value.

3. A reproducing device as claimed in claim 1, wherein said first predetermined distance is detected after the objective lens begins moving at said first velocity.

4. A reproducing device as claimed in claim 1, further comprising:
- second moving means responsive to said lead-in command for moving the objective lens away from the recording surface;
- means for determining said objective lens has moved a second predetermined distance away from the recording surface; and
- third moving means responsive to said predetermined distance determining means for moving the objective lens toward the recording surface at said first velocity after the objective lens has been moved said predetermined distance away from the recording surface.

5. A focus servo lead-in method in which an objective lens is used to focus a beam of light on a recording surface to thereby provide a reflected beam and a focus servo loop for maintaining the focus of said objective lens, comprising the steps of:
- setting said focus servo loop to an open state, so that said focus servo loop does not control the movement of said objective lens, responsive to a lead-in command;
- moving said objective lens at a first velocity towards said recording surface, responsive to said lead-in command;
- moving said objective lens at a second velocity, said second velocity being less than said first velocity, towards said recording surface when an intensity of said reflected beam indicates a predetermined relationship between said objective lens and said recording surface; and
- providing focusing signals representing the state of focusing of said beam on said recording surface;
- stopping movement of said objective lens at said second velocity and closing said focus servo loop when said focusing signals indicate an in-focus condition.

6. A focus servo lead-in method as claimed in claim 5, further comprising the step of determining from the intensity said reflected beam that said predetermined relationship has occurred when the intensity of said reflected beam received from said recording surface exceeds a predetermined value.

7. A focus servo lead-in method as claimed in claim 5, wherein the intensity of said reflected beam indicates said predetermined relationship after the objective lens begins moving at said first velocity towards said recording surface.

8. A focus servo lead-in method as claimed in claim 5, further comprising the steps of:
- moving the objective lens away from the recording surface responsive to said lead-in command;
- determining that said objective lens has moved a predetermined distance away from the recording surface;
- moving the objective lens toward the recording surface at said first velocity after determining that the objective lens has been moved a predetermined distance away from the recording surface.

* * * * *